Nov. 28, 1933.                 L. E. MYLTING                 1,937,461
                              OIL SEALING DEVICE
                            Filed Oct. 25, 1930                 2 Sheets-Sheet 2
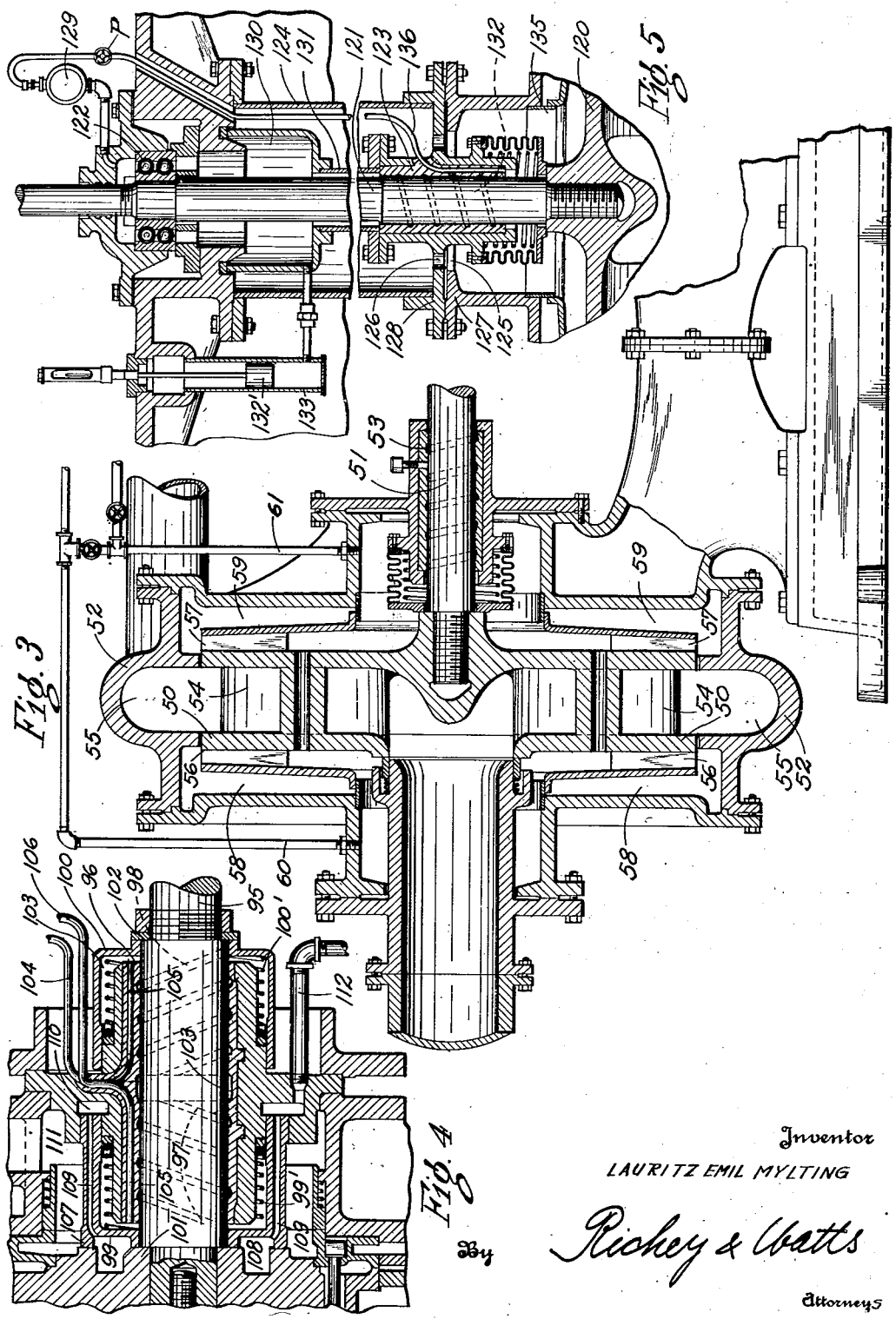
Inventor
LAURITZ EMIL MYLTING
By Richey & Watts
Attorneys Patented Nov. 28, 1933

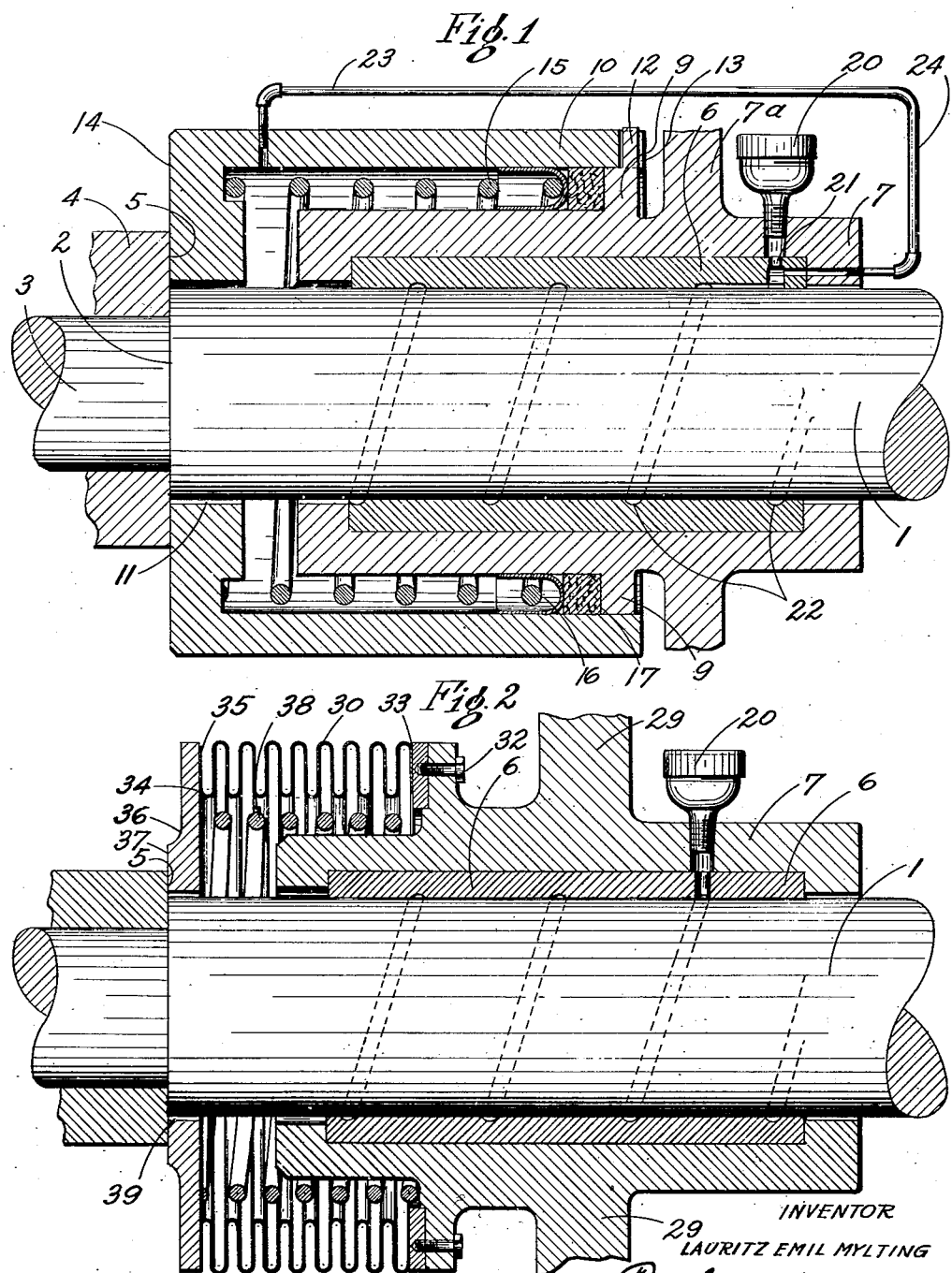

1,937,461

UNITED STATES PATENT OFFICE 1,937,461

OIL SEALING DEVICE

Lauritz Emil Mylting, Philadelphia, Pa., assignor to The Allen-Sherman-Hoff Company, a corporation of Pennsylvania Application October 25, 1930. Serial No. 491,140

9 Claims. (Cl. 308—134)

The invention relates to a sealing device and more particularly to a sealing device for preventing an undesired fluid from reaching certain portions of a shaft when the shaft operates within a chamber containing the fluid. The invention also relates to a device for preventing a fluid from reaching a bearing and to prevent the undesired fluid from reaching and mixing with the lubricant of the bearing.

The invention is particularly applicable to centrifugal pumps especially those used for pumping ash water or other liquids which contain foreign matter as well as liquids which tend to erode shafting and attack rubber and lubricants.

In centrifugal pumps there has always been a problem to provide a satisfactory type of bearing for the impeller shaft and also to prevent the escape of the liquid from the impeller chamber through the packing around the shaft. The liquid often entered the bearing chamber, mixed with the lubricant and thus caused heating of the bearing and other injuries.

To overcome this difficulty rubber bearings have been used in many situations where the liquid pumped, such as clean water, did not deteriorate the rubber and could be used as a lubricant for the rubber bearing. This has proved satisfactory in many situations.

In other situations this type of bearing was unsuited and in many instances only an oil or grease lubricated bearing properly protected from the liquid used in the pump could be used satisfactorily. Many attempts were made to protect the bearings and prevent the escape of the liquid but all of them involved the use of packing joints which were found to be troublesome, so far as I am aware.

Consequently one of the objects of applicant's invention is to provide a sealing device which will prevent the escape of a liquid through the shaft openings in a centrifugal pump without using packing joints.

A more general object of the invention is to provide a sealing device which will prevent a fluid from reaching certain portions of a shaft. Another object of the invention is to prevent a fluid from reaching a bearing. A still further object is to prevent a fluid from reaching a bearing and mixing with the lubricant thereof.

Another object of the invention is to provide a sealing device having no packing joints and which is adapted to be used with a circumferentially movable shaft.

Other objects will be apparent from the specification and the accompanying drawings in which:

Fig. 1 is a sectional view of one embodiment of the invention;

Fig. 2 is a modified form thereof.

Fig. 3 is a vertical section of a horizontal centrifugal pump embodying one form of the invention;

Fig. 4 is a fragmentary section of a horizontal pump illustrating modified bearing construction generally similar to that shown in Fig. 1 and Fig. 5 is a fragmentary section of a vertical centrifugal pump embodying a bearing generally similar to that shown in Fig. 2.

In Fig. 1 is shown a shaft 1 having a shoulder 2 and a reduced portion 3. Upon this reduced portion 3 of the shaft, a collar or hub 4 is fixed against the shoulder 2 and this collar 4 forms a second shoulder 5. The end surface, which forms this shoulder 5, is ground.

This member 4 may be a collar or any other sort of a member such as the hub of an impeller for a pump or turbine. The member 4 and the shoulder 5 may be made as an integral part of the shaft 1, if desired, so far as the purposes of this particular invention are concerned.

The shaft 1 is supported by a bearing 6 which is in turn fitted or cast into and supported by the bearing housing 7. Cast integral with the bearing housing is a casing 7a of a centrifugal pump or similar device. An annular flange 9 is also cast integral with the bearing housing 7 and riding on this flange 9 and surrounding a portion of the bearing housing is an annular spring housing 10 which also serves to form a lubricant chamber between itself and parts of the shaft and bearing housing. The inner end of the spring housing has an aperture 11 for the passage therethrough of the shaft. The diameter of this aperture is slightly larger than the diameter of the shaft to provide clearance and eliminate friction between the housing and shaft.

A radial projection 12 on the flange 9 loosely fits into a recess 13 in the spring housing thus preventing rotational movement of the spring housing around the bearing housing and at the same time allowing for limited relative axial movement between the parts.

The end face 14 of the spring housing is ground so that a comparatively tight joint may be formed between the spring housing and the shoulder 5. The end face 14 is resiliently urged against the ground shoulder 5 by means of the compression spring 15 which is disposed between the spring housing 10 and the flange 9 on the bearing housing. The end of the spring adjacent the flange 9 is disposed in an annular spring seat 16 of U-shaped cross-section and interposed between this spring seat and the flange 9 is a ring of packing material 17. The spring 15, therefore, not only insures a close fit between the spring housing and the shoulder 5 but also urges the packing material up against the flange 9 and prevents leakage of lubricant between the spring housing and the flange 9.

Lubricant is supplied to the bearing in any known manner, but preferably, and as shown, an oil cup 20 is employed. The lubricant gains access to the bearing through a port 21 which leads to the inner surface of the bearing and communicates with a helical oil groove 22 therein. Thus during rotation of the shaft lubricant will be carried by the shaft along the helical oil groove into the annular oil chamber formed between the spring housing and the shaft and bearing housing until, after the oil chamber is full, an oil pressure will be built up in the chamber which, in the case of a centrifugal pump, may be greater than the pressure of the fluid in the impeller chamber of the pump. The only place where it would be possible for the liquid being pumped to gain access to the bearing is between the shoulder 5 of collar or hub 4 and the end face 14 of the spring housing, but since the oil in the oil chamber is maintained under greater pressure than the fluid in the impeller chamber, if there be any leakage at all it will be from the oil chamber to the impeller chamber. Thus it will be obvious that liquid containing deleterious matter is excluded from the shaft bearing.

The relative movement between the rotating shoulder 5 and the end face 14 of the housing will tend to throw a small quantity of oil outwardly by centrifugal force away from the bearing and into the pump chamber. This quantity of oil is very small but is sufficient to effectively lubricate the sealing surfaces and to definitely avoid the possibility of leakage of the liquid being pumped into the bearing enclosure. The grooved bearing and the sealing surfaces may be so proportioned that the combined heads, due to the pumping action of the groove in the bearings and the above noted pumping action of the sealing surfaces, will balance or exceed the pressure of the sealing liquid. The sealing surfaces (5 and 14 in Figure 1) may also, if desired, be so proportioned that they alone cause such head to balance or exceed the outside liquid pressure. A pressure relief valve such as indicated at P in Figure 5, may be inserted in the oil line leading from the end of the bearing, this valve being so arranged that by properly adjusting it the oil pressure in the lubricating chamber may be maintained at any desired point while the pump is in operation.

In order to allow for circulation of the lubricant through the bearing, fluid communication is established between the oil chamber and the groove in the bearing near the outer end thereof by means of the oil line 23. This may be a flexible line or it may be a pipe line such as shown, having a leg 24 at an angle to the main section of the line or it may be a loop so as not to prevent limited relative axial movement between the spring housing and the bearing housing.

The modification of the device shown in Fig. 2 is similar in many respects to that shown in Fig. 1 but in place of the annular spring housing 10 a metal bellows 30 is employed. As in the preferred form, a flange 9 is cast integral with the bearing housing 7. Also shown as cast integral with the bearing housing is the casing 29 of a centrifugal pump or similar device. A ring 31 is secured to the flange 9 by means of screws 32. This connection is made fluid tight. The bellows 30 surround a portion of the shaft 1 and is brazed to this bellows ring 31 as shown at 33. What is commercially known as a sylphon bellows is shown but any suitable type of bellows or flexible casing may be used. A sealing ring 34 surrounds the shaft 1 and is connected to the other end of the bellows 12 by a brazed joint 35. If desired, however, these connections may be made by welding, ordinary soldering or any suitable means which will produce a fluid tight joint.

On one side of the sealing ring 34 and concentric with the shaft 1 is a boss 36 having a ground surface on its face 37. This face 37 is resiliently urged against the shoulder 5 by a compression spring 38 one end of which surrounds the bearing housing and abuts against the flange 9 and the other end of which abuts against the sealing ring 34. Thus a comparatively tight joint is formed between the shoulder 5 and the sealing ring 34, and is maintained at all times by the spring 18. Clearance, as shown at 39, is provided to prevent friction between the sealing ring and the shaft.

The flexibility of the bellows and the provision of the spring 38 for pressing the sealing ring 34 against the shoulder 5 allows a limited axial movement of the shaft while at the same time it maintains the sealing ring in close contact with the shoulder 5.

In this modification, as in the preferred form the bearing is provided with helical oil grooves so that an oil pressure will be built up during rotation of the shaft in the oil chamber formed between the bellows and the shaft and bearing housing, thereby preventing any leakage between the sealing ring 34 and a shoulder 5 from the impeller chamber to the oil chamber. Lubricant may be supplied to the bearing in any suitable manner but an oil cup 20 is shown similar to the one shown in the preferred form of the invention.

Fig. 3 shows the modification of the sealing device illustrated in Fig. 2 applied to the shaft of a pump of the horizontal centrifugal type, such as disclosed in the copending application of Frank B. Allen, filed August 21, 1930, Serial No. 476,734.

The impeller 50 of the pump is mounted upon a shaft 51 and disposed within a casing 52. The shaft 51 is journaled in a bearing 53 similar to bearing 6 in Fig. 2. The impeller is composed of main blades 54 which are disposed within a main pumping chamber 55 and auxiliary blades 56 and 57 which are disposed within auxiliary water chambers 58 and 59 respectively. Flushing water is conducted to the auxiliary chambers by means of pipes 60 and 61 to maintain the pressure in the auxiliary chambers 58 and 59 greater than that in the main chamber 55 during rotation of the impeller 50. This construction prevents abrasive carrying liquid flowing from the main chamber into the auxiliary chambers.

Fig. 4 illustrates a modified form of bearing particularly adapted to support the shaft of a horizontal centrifugal pump. In this bearing, the shaft 95 rotates in and is supported by the bearing 96 which may be carried by a suitable casting mounted on the pump in any desired manner. The bearing 96 has spiral grooves 97 and 98 extending from the center of the bearing outwardly to the ends in opposite directions. The bearing is enclosed by the end closure cups or annular spring housing 99 and 100. The end of housing 99 abuts against the hub of an impeller 101 and the end of housing 100 abuts against ring 102 mounted upon the shaft 95. The inner ends of these cup shaped enclosing members have sliding fits on the outside of the bearing supporting casting and are spring pressed into constant contact with the impeller 101 and the ring 102, respectively, by means of the helical springs 99' and 100'.

Lubricant enters a central annular groove 103 through a pipe 104 which may lead from an oil reservoir (not shown). This lubricant is picked up by the rotating shaft and carried in the spiral grooves 97 and 98 outwardly to the ends of the bearing member 96. Lubricant will thus be forced into the chambers formed between the spring housings 99 and 100 and the shaft until a pressure is built up within the chambers thus preventing entrance of deleterious fluid to the shaft bearing. Pipes 105 and 106 which are connected to the oil reservoir allow for continuous circulation of the oil during rotation of the shaft.

The above described bearing construction provides a completely enclosed automatic oil circulating bearing which is particularly adapted for use in horizontal centrifugal pumps. An additional feature of the construction illustrated in Fig. 4, is the drainage system which is adapted to carry away any undesirable clear flushing liquid and oil seepage. It may in special cases be necessary to keep oil from leaking into the pumped fluid. The drain-off chamber 108 serves to accomplish this. The enclosing cup member 99 is provided with a ring shaped extension 107 which bears against the impeller 101 forming an annular chamber 108. Passages 109 extend through the walls of member 99 and open at one end into the chamber 108 and at their other ends into the chamber 110. As the chamber 111 is always filled with clear water, some of this water will leak down between the extending ring 107 and the impeller 101 into the chamber 108 and also some will leak into annular chamber 110. This will all eventually be conducted to the lower part of chamber 110 by the pipes 109 and may be carried away from chamber 110 to a suitable place of discharge by the pipe 112.

Fig. 5 illustrates a vertical centrifugal pump and shows a sealing device similar to that of Fig. 2 incorporated therein. The impeller 120 is mounted on a vertical shaft 121 which is supported in bearings 122 and 123. In this type of pump a shell or tank 124 surrounds the shaft 121 and forms a reservoir for the clear flushing water which may enter it from a suitable source (not shown) and pass down through suitable apertures 125 and 126 in the pump casing 127 and bearing supporting flange 128, respectively. Lubricant is supplied to the bearing 122 from a lubricant chamber 129. The lubricant flows through the bearing 122 and into a reservoir 130. From the reservoir it flows along the shaft 121 within a sleeve 131 which surrounds the shaft and into the spiral oil grooves 132. A float 132' within a cylinder 133 having communication with the reservoir 130 is connected to an indicator 134 to indicate the level of oil in the reservoir. Rotation of the shaft forces the lubricant along the spiral grooves into the chamber formed between the spring housing 135 and the shaft. A pipe 136 leads from the chamber back to the lubricant chamber 129 to provide for continuous circulation of the lubricant during rotation of the shaft 121.

While preferred embodiments of the invention have been shown and described, it will be apparent that modifications may be made therein within the spirit and scope of the invention to be covered by the appended claims.

I claim:

1. In a sealing device for a rotatable shaft, a bearing for said shaft, a shoulder on said shaft and rotatable therewith, sealing means surrounding said bearing and having a sealing surface adapted to engage said shoulder to exclude undesired material from said bearing, a source of supply of lubricant for said bearing, and means for creating a flow of said lubricant through said bearing toward said sealing means, said flow creating means being adapted to build up a lubricant pressure against said sealing means tending to urge said sealing means into sealing contact with said shoulder.

2. In a sealing device for a rotatable shaft, a bearing housing, a bearing for said shaft in said bearing housing, a shoulder on said shaft and rotatable therewith, sealing means surrounding said housing and in sliding engagement therewith to exclude undesired material from said bearing, said sealing means having a sealing surface adapted to engage said shoulder, a source of supply of lubricant for said bearing, and means for creating a flow of said lubricant through said bearing toward said sealing means, said flow creating means being adapted to build up a lubricant pressure against said sealing means tending to urge said sealing means into sealing contact with said shoulder.

3. In a sealing device for a rotatable shaft, a bearing housing, a bearing for said shaft in said housing, a shoulder on said shaft and rotatable therewith, sealing means surrounding said housing and in sliding engagement therewith, means for maintaining the joint between said housing and said sealing means fluid tight, a source of supply of lubricant for said bearing, and means for creating a flow of said lubricant through said bearing toward said sealing means, said flow creating means being adapted to build up a lubricant pressure against said sealing means tending to urge said sealing means into sealing contact with said shoulder.

4. In a sealing device for a rotatable shaft, a bearing housing, a bearing for said shaft in said housing, a shoulder on said shaft and rotatable therewith, sealing means surrounding said housing and in fluid tight engagement therewith, a source of supply of lubricant for said bearing, and means for creating a flow of said lubricant through said bearing toward said sealing means, said flow creating means being adapted to build up a lubricant pressure against said sealing means tending to urge said sealing means into sealing contact with said shoulder.

5. In a sealing device for a rotatable shaft, a bearing for said shaft, a rotatable member mounted on said shaft and rotatable therewith, sealing means surrounding said bearing and in fluid tight engagement therewith, means for creating a flow of lubricant through said bearing toward said sealing means, said flow creating means being adapted to build up a lubricant pressure against said sealing means tending to urge said sealing means into sealing contact with said rotatable member.

6. In an oil sealing device for a rotatable shaft, a bearing for said shaft, a rotatable member mounted on said shaft and rotatable therewith, sealing means surrounding said bearing in spaced relation thereto to provide a lubricant chamber around said shaft, a source of supply of lubricant for said bearing, means for delivering lubricant from said supply through said bearing to said chamber, said lubricant delivering means being adapted to build up a lubricant pressure within said lubricant chamber tending to move said sealing means into sealing relation with said rotatable member.

7. In an oil sealing device for a rotatable shaft, a bearing for said shaft means for supplying lubricant to said shaft, a rotatable member mounted on said shaft and rotatable therewith, sealing means surrounding said bearing in spaced relation thereto to provide a lubricant chamber around said shaft, means for causing lubricant to flow through said bearing into said chamber, a conduit affording a lubricant return passage between said chamber and said lubricant supplying means, said means for creating a flow of lubricant through said bearing being adapted to create a lubricant pressure in said lubricant chamber tending to move said sealing means into sealing engagement with said rotatable member.

8. In a sealing device for a rotatable shaft, a bearing for said shaft, a source of supply of lubricant for said bearing, a shoulder on said shaft and rotatable therewith, sealing means surrounding said shaft in spaced relation thereto and forming a lubricant chamber around said shaft, a fluid tight joint between said bearing and said sealing means, means for causing lubricant from said source of supply to flow through said bearing into said lubricant chamber, a conduit affording a lubricant return from said chamber to said source of lubricant supply, said means for causing lubricant to flow through said bearing being adapted to create a lubricant pressure against said sealing means tending to move said sealing means into sealing engagement with said shoulder.

9. In a sealing device for a rotatable shaft, a bearing for said shaft, a source of supply of lubricant for said bearing, a shoulder on said shaft and rotatable therewith, sealing means surrounding said shaft in spaced relation thereto and forming a lubricant chamber around said shaft, a fluid tight joint between said bearing and said sealing means, means for causing lubricant from said source of supply to flow through said bearing into said lubricant chamber, a conduit affording a lubricant return from said chamber to said source of lubricant supply, said means for causing lubricant to flow through said bearing being adapted to create a lubricant pressure against said sealing means tending to move said sealing means into sealing engagement with said shoulder and valve means in said lubricant return conduit for controlling the pressure within said lubricant chamber.

LAURITZ EMIL MYLTING.